United States Patent [19]

Watkins et al.

[11] Patent Number: 4,977,224

[45] Date of Patent: Dec. 11, 1990

[54] PROCESS FOR THE PREPARATION OF COPOLY(ARYLENE SULFIDE) HAVING A DECREASED AMOUNT OF DISULFIDE RADICALS

[75] Inventors: Joseph J. Watkins; David R. Fagerburg, both of Kingsport; Paul B. Lawrence, Blountville; Mark Rule, Kingsport, all of Tenn.

[73] Assignee: Eastman Kodak Company, Rochester, N.Y.

[21] Appl. No.: 437,701

[22] Filed: Nov. 17, 1989

[51] Int. Cl.$^5$ ............... C08G 75/10; C08G 75/14
[52] U.S. Cl. ............... 525/471; 525/535; 525/537; 528/389
[58] Field of Search ............... 525/535, 537, 471

[56] References Cited

U.S. PATENT DOCUMENTS

| | | | |
|---|---|---|---|
| 3,395,132 | 7/1968 | Smith | 525/537 |
| 4,350,810 | 9/1982 | Tieszen et al. | 525/537 |
| 4,605,713 | 8/1986 | Heitz et al. | 525/530 |
| 4,786,713 | 11/1988 | Rule et al. | 528/389 |
| 4,855,393 | 8/1989 | Rule et al. | |

Primary Examiner—Lewis T. Jacobs
Assistant Examiner—David W. Woodward
Attorney, Agent, or Firm—Charles R. Martin; William P. Heath, Jr.

[57] ABSTRACT

A process for preparation of a copoly(arylene sulfide) which has a decreased amount of disulfide radicals and corresponds to the structure

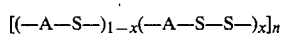

wherein
A is a divalent substituted or unsubstituted aromatic radical, x is in the range of 0.45 to 0 and n is at least 50,
comprising contacting a copoly(arylene sulfide) corresponding to the structure

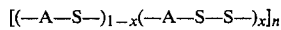

wherein
A is a divalent substituted or unsubstituted aromatic radical, x is in the range of 0.50 to 0.001 and n is at least 25,
in the melt phase with a diiodoaromatic compound corresponding to the structure

I-A-I wherein
A is a divalent substituted or unsubstituted aromatic radical.

7 Claims, No Drawings

PROCESS FOR THE PREPARATION OF COPOLY(ARYLENE SULFIDE) HAVING A DECREASED AMOUNT OF DISULFIDE RADICALS

The invention relates to a process for the preparation of a copoly(arylene sulfide) having a decreased amount of disulfide radicals by heating the copoly(arylene sulfide) in the presence of a diiodoaromatic compound.

Poly(arylene sulfide) resins are thermosetting-thermoplastic polymeric materials with good thermal stability, unusual insolubility, resistance to chemical environments and inherent flame resistance. These resins additionally have good electrical insulative properties which make them ideal for electrical and electronic applications. Their excellent resistance to chemical degradation makes them ideal for use in chemical environments which involve organic solvents and strong mineral acids, such as coatings for pipes, tanks, pumps and other equipment.

U.S. Pat. No. 4,855,393 discloses a process for preparation of a copoly(arylene sulfide) wherein elemental sulfur is reacted with diiodobenzene. U.S. Pat. No. 4,786,713 discloses the copoly(arylene sulfide) resulting from this process. This copoly(arylene sulfide) correspond to the structure $$[(-A-S-)_{1-x}(-A-S-S-)_x]_n$$

wherein
A is a divalent substituted or unsubstituted aromatic radical, x in the range of 0.50 to 0.001 and n is at least 200.

The amount of disulfide radical which corresponds to the formula $$(-A-S-S-)_x$$

is an important feature of this polymer. For certain applications such as film and fiber and certain molding applications it is desirable that the amount of disulfide radical be in lower part of the range of 0.5 to 0.001. One approach to obtaining a polymer with the amount of disulfide radicals in the low is to prepare the polymer originally with the low amount of disulfide radicals. This is often difficult because of the potential for solidification of the molten polymer during its preparation. If the attempt to prepare a polymer with the desired low amount of disulfide radicals is unsuccessful the polymer is of no value for the particular application requiring the low amount of disulfide radicals and must be discarded or used for some other application.

We have now discovered a way to decrease the amount of disulfide radicals if the amount of disulfide radicals in the original polymer is higher than desired. We have discovered that the amount of disulfide radicals can be decreased by contacting polymer with a diiodoaromatic compound in the melt phase.

Broadly the process of this invention can be thought of as a process for preparation of a copoly(arylene sulfide) which has a decreased amount of disulfide radicals and corresponds to the structure $$[(-A-S-)_{1-x}(-A-S-S-)_x]_n$$

wherein
A is a divalent substituted or unsubstituted aromatic radical, x is in the range of 0.45 to 0, preferably 0.25 to 0, more preferably 0.15 to 0 and even more preferably 0.10 to 0, and n is at least 50,
comprising contacting a copoly(arylene sulfide) corresponding to the structure $$[(-A-S-)_{1-x}(-A-S-S-)_x]_n$$

wherein
A is a divalent substituted or unsubstituted aromatic radical, x is in the range of 0.50 to 0.01, preferably 0.30 to 0.01, more preferably 0.20 to 0.01 and even more preferably 0.15 to 0.01 and n is at least 25,
in the melt phase with a diiodoaromatic compound corresponding to the structure

I-A-I wherein
A is a divalent substituted or unsubstituted aromatic radical.

Both the original copoly(arylene sulfide) which has the amount of disulfide radicals decreased by the process of the invention and the resulting copoly(arylene sulfide) which has a decreased amount of disulfide radicals are disclosed in U.S. Pat. Nos. 4,855,393 and 4,786,713, herein incorporated by reference.

Broadly, the diiodoaromatic compound which is contacted with the polymer in this invent may be any diiodoaromatic compound but usually is the diiodoaromatic compound which is used to prepare the original copoly(arylene sulfide) and disclosed in the above cited patents. Preferably, the diiodoaromatic compound is selected from the group consisting of diiodobenzenes, diiodonaphthalenes, diiodobiphenyls, diiodotoluenes, diiodophenyl sulfones, and diiodobenzophenones. Most preferably the diiodoaromatic compound is selected from the group consisting of p-diiodobenzene, m-diiodobenzene, p,p'-diiodobiphenyl, 2,6-diiodonaphthalene, (p-iodophenyl) sulfone, and 4,4'-diiodobenzophenone. Paradiiodobenzene is a particularly preferred species.

The reaction between the copoly(arylene sulfide) and the diiodoaromatic compound is carried out in the melt phase by heating the original copoly(arylene sulfide) until it melts and then contacting the molten polymer with the diiodoaromatic compound.

During the reaction between the copoly(arylene sulfide) and the diiodoaromatic compound elemental iodine is produced and evolves from the reaction melt. Removal of the elemental iodine may provide a driving force for completion of the reaction. The iodine may be removed by passing a stream of air or an inert gas such as nitrogen or argon over or through the reaction mass at atmospheric or superatmospheric pressure or alternatively by applying a vacuum to the reaction apparatus. The elemental iodine may be collected and used as a commercial product or as a reactant for further chemical processes.

The ratio of the amount of diiodoaromatic compound to the amount of disulfide radicals is an important aspect of this invention. The ratio of diiodoaromatic compound to disulfide radical should not exceed two moles of diiodoaromatic compound to one mole of disulfide radical. When the ratio of diiodoaromatic compound to disulfide radical exceeds one, the molecular weight of the polymer is degraded and the polymer becomes terminated with iodoaryl end-groups. Ideally, the ratio of diiodoaromatic compound to disulfide radicals should be exactly one. If the ratio cannot be controlled so that it is exactly one it is preferred it be less than one so as to avoid molecular weight degradation and can be as low as 0.1 or more preferably as low as >0.25. This ratio is also influenced by reaction conditions with longer reaction times and temperatures requiring lower ratios. Thus, the ratio can broadly be in the range of 2.0 to 0.1, preferably in the range of 1.75 to 0.2 and most preferably in the range of 1.5 to 0.25.

The use of monoiodoaromatic compounds is also within the scope of this invention. If monoiodoaromatic compounds are used the overall chain length of the polymer will be reduced due to the monofunctional nature of the iodoaromatic compound. The monoiodo compounds useful are the same as the diiodoaromatic compounds except that only one iodine substitution is present.

The disulfide content of both the original copoly(arylene sulfide) and the resulting copoly(arylene sulfide) is defined as the amount of sulfur which is excess over one sulfur per repeat unit and can be determined via elemental analysis calculation in which the carbon atoms are set equal to exactly six.

The process of this invention can be carried out under a wide range of reaction conditions. Broadly, the reaction temperature should be no less than 250° C. and no higher than about 375° C. Preferably, the reaction temperature should not be less than 275° C. and no more than 350° C. and more preferably from 275° C. to 325° C. The reaction temperature must in any event be high enough to obtain a melt of the polymer. Reaction times may vary considerably. Although in theory an almost infinitely long reaction time could be employed, in practice reactions are carried out for no longer than 8 hours and preferably no longer than 4 hours and more preferably no longer than 2 hours. The minimum reaction time will be dictated by the amount of time to achieve reaction of the diiodoaromatic compound and generally is at least 5 min. and preferably at least 10 min.

The utility of the polymer prepared by the process of this invention depends on the chain length, or value of n. When the value of n is sufficiently low that the polymer is a liquid the polymer can be used as a coating or as a starting material for preparation of a high molecular weight polymer by solid stating or other conventional techniques for molecular weight buildup. When the value of n is sufficiently high the polymer is a solid it can be used as a molding plastic or as a starting material for preparation of a polymer of even higher molecular weights by solid starting or other conventional means for increasing the molecular weight.

In the following examples, elemental analysis is performed by standard combustion techniques.

EXAMPLES

1. This example illustrates the preparation of a copoly(arylene sulfide) having an amount of disulfide radicals which can be decreased by the process of this invention.

Into a 5 liter 3-neck round bottom flask are weighed the following: 380 g sulfur (11.9 mol), 4100 g p-diiodobenzene (12.4 mol, 4.9 mol % excess), and 8.0 g of 1.3-diiodo-5-nitrobenzene to act as a catalyst. The flask was fitted with a 350 Vigreux column, a mechanical stirrer through the center joint, and an inlet tube for a slow air sweep. The column was attached via a distillation head and a takeoff tube to a distillation receiver which was cooled in dry ice. The receiver was connected to a vacuum source. The flask was maintained at 200 torr pressure and immersed in a metal bath controlled at 225° C. It was held under these conditions for 2 hours, at which time the bath temperature was raised to 230° C. After 2 hours, the bath temperature was raised to 235° C. After 2 more hours have elapsed (6 hours total time from the reaction start at this point) the pressure was reduced to 120 torr, held for 2 hours and then reduced to 60 torr where it was held for an additional 30 minutes. The reaction flask was removed from the metal bath, repressurized with nitrogen, and allowed to cool under nitrogen. The polymer yield was 130% of a dark polymer with low melt viscosity which did not crystallize. Elemental analysis gave: carbon 63.34%, hydrogen 3.54%, sulfur 33.62%, and iodine 1.31%. The amount of disulfide radicals is calculated to be 19.3 mol percent.

2. This example illustrates preparation of a copoly(arylene sulfide) having a decreased amount of disulfide radicals in accordance with this invention.

Twenty grams of the polymer of prepared in Example 1 having 19.3 mol percent disulfide radicals was combined in a 100 ml flask with 10.0 g p-diiodobenzene (0.0303 mol, 0.9 ratio). The flask was held at a pressure of 200 torr and immersed in a 250° C. metal bath. After 1 hour 17 minutes, the pressure was reduced to 10 torr for 20 minutes and the reaction apparatus repressurized with nitrogen and allowed to cool. The product was a crystalline material with the following elemental analysis: C 55.42%, H 3.07%, S 24.96%, and I 18.23%. The amount of disulfide radicals was calculated to be 1.2 mol percent. Thus the amount of disulfide radicals was lowered from 19.3 in the original polymer to 1.2 mol percent in the resulting polymer.

3. This example further illustrates preparation of a copoly(arylene sulfide) having a decreased amount of disulfide radicals in accordance with this invention.

Twenty grams of the polymer of Example 1 was combined in a 100 ml flask with 7.50 g p-diiodobenzene (0.0227 mol, 0.73 ratio). The heating and pressure profile of this reaction was essentially identical to that of Example 2. Elemental analysis of the crystalline product gave: carbon 57.44%, hydrogen 3.18%, sulfur 27.32%, and iodine 12.29%. The amount of disulfide radicals is calculated to be 6.9 mol percent.

4. This example further illustrates preparation of a copoly(arylene sulfide) having a decreased amount of disulfide radicals in accordance with this invention.

A polymer was prepared in a manner similar to Example 1 which was partly crystalline with a 1040 poise melt viscosity at 300° C. The amount of disulfide radical was calculated to be 16.0 mol percent. Twenty grams of this polymer (0.0283 mol disulfide linkages) was reacted with 9.3 g (0.0282 mol, 1.00 ratio) of p-diiodobenzene in a manner similar to Example 2 and 3 The resulting polymer was crystalline with an elemental analyses of: C 54.24%, H 3.05%, S 25.19% and I 17.92%. The amount of disulfide radicals was calculated to be 4.4 mol percent compared to a disulfide content of 16.0 mol percent in the original polymer.

We claim:

1. A process for preparation of a copoly(arylene sulfide) which has a decreased amount of disulfide radicals and corresponds to the structure $$[(-A-S-)_{1-x}(-A-S-S-)_x]_n$$

wherein
  A is a divalent substituted or unsubstituted aromatic radical, x is in the range of 0.45 to 0 and n is at least 50,
  comprising contacting a copoly(arylene sulfide) corresponding to the structure $$[(-A-S-)_{1-x}(-A-S-S-)_x]_n$$

wherein
  A is a divalent substituted or unsubstituted aromatic radical, x is in the range of 0.50 to 0.01 and n is at least 25,
in the melt phase at a temperature in the range of 257°–350° C. with a diiodoaromatic compound corresponding to the structure

I-A-I wherein
  A is a divalent substituted or unsubstituted aromatic radical.

2. The process of claim 1 wherein the divalent aromatic radical A is provided by a compound selected from the group consisting of diiodobenzenes, diiodonaphthalenes, diiodobiphenyls, diiodotoluenes, diiodophenyl sulfones, and diiodobenzophenones.

3. The process of claim 1 wherein the divalent aromatic radical A is provided by a compound selected from the group consisting of p-diiodobenzene, m-diiodobenzene, p,p'-diiodobiphenyl, p,p'-diiodobiphenyl ether, 2,6-diiodonaphthalene, (p-iodophenyl) sulfone, and 4,4'-diiodobenzophenone.

4. The process of claim 1 wherein the temperature is in the range of 275°–325° C.

5. A process for preparation of a copoly(arylene sulfide) which has a decreased amount of disulfide radicals and corresponds to the structure $$[(-A-S-)_{1-x}(-A-S-S-)_x]_n$$

wherein
  A is a divalent substituted or unsubstituted aromatic radical, x is in the range of 0.25 to 0 and n is at least 50,
  comprising contacting a copoly(arylene sulfide) corresponding to the structure $$[(-A-S-)_{1-x}(-A-S-S-)_x]_n$$

wherein
  A is a divalent substituted or unsubstituted aromatic radical, x is in the range of 0.30 to 0.01 and n is at least 25,
in the melt phase with a diiodoaromatic compound corresponding to the structure

I-A-I wherein
  A is a divalent substituted or unsubstituted aromatic radical.

6. A process for preparation of a copoly(arylene sulfide) which has a decreased amount of disulfide radicals and corresponds to the structure $$[(-A-S-)_{1-x}(-A-S-S-)_x]_n$$

wherein
  A is a divalent substituted or unsubstituted aromatic radical, x is in the range of 0.15 to 0 and n is at least 50,
  comprising contacting a copoly(arylene sulfide) corresponding to the structure $$[(-A-S-)_{1-x}(-A-S-S-)_x]_n$$

wherein
  A is a divalent substituted or unsubstituted aromatic radical, x is in the range of 0.20 to 0.01 and n is at least 25,
in the melt phase with a diiodoaromatic compound corresponding to the structure

I-A-I wherein
  A is a divalent substituted or unsubstituted aromatic radical.

7. A process for preparation of a copoly(arylene sulfide) which has a decreased amount of disulfide radicals and corresponds to the structure $$[(-A-S-)_{1-x}(-A-S-S-)_x]_n$$

wherein
  A is a divalent substituted or unsubstituted aromatic radical, x is in the range of 0.10 to 0 and n is at least 50,
  comprising contacting a copoly(arylene sulfide) corresponding to the structure $$[(-A-S-)_{1-x}(-A-S-S-)_x]_n$$

wherein
  A is a divalent substituted or unsubstituted aromatic radical, x is in the range of 0.15 to 0.01 and n is at least 25,
in the melt phase with a diiodoaromatic compound corresponding to the structure

I-A-I wherein
  A is a divalent substituted or unsubstituted aromatic radical.

* * * * *